(12) United States Patent
Muchin et al.

(10) Patent No.: US 8,534,515 B2
(45) Date of Patent: Sep. 17, 2013

(54) PIVOTING ELASTIC SHOULDER SUPPORT

(75) Inventors: Jay Z. Muchin, Maintowoc, WI (US); David J. Merten, Manitowoc, WI (US)

(73) Assignee: M Group, Inc., Manitowoc, WI (US)

( * ) Notice: Subject to any disclaimer, the term of this patent is extended or adjusted under 35 U.S.C. 154(b) by 244 days.

(21) Appl. No.: 13/198,166

(22) Filed: Aug. 4, 2011

(65) Prior Publication Data

US 2013/0031705 A1    Feb. 7, 2013

(51) Int. Cl.
   *A45F 3/14*    (2006.01)
(52) U.S. Cl.
   USPC ........... 224/264; 224/257; 224/254; 24/265 H
(58) Field of Classification Search
   USPC .................. 224/264, 600, 602, 607, 610, 259, 224/611, 148.6, 612, 614, 616, 617, 148.8, 224/254, 258, 268, 625, 257; 24/3.4, 265 R, 24/265 H, 302, 376, 369; 30/275.4; 294/148, 294/156, 82.31
   See application file for complete search history.

(56) References Cited

U.S. PATENT DOCUMENTS

| | | | |
|---|---|---|---|
| 609,731 A * | 8/1898 | Carley | 224/617 |
| 1,637,003 A * | 7/1927 | Lang | 224/258 |
| 5,544,795 A | 8/1996 | Perrin | |
| 5,695,102 A | 12/1997 | Jackson | |
| 6,158,636 A | 12/2000 | Latiolais | |
| 2006/0108387 A1* | 5/2006 | Nakaya et al. | 224/254 |
| 2007/0205237 A1* | 9/2007 | Machens et al. | 224/264 |
| 2007/0261213 A1 | 11/2007 | Nolan et al. | |
| 2008/0142557 A1 | 6/2008 | Hess et al. | |
| 2008/0203127 A1* | 8/2008 | Castillo-Garrison | 224/607 |

OTHER PUBLICATIONS

Trimmer Assist, "Trimmer Assist—Gravity Defying Trimmer System", www.trimmerassist.net/trimmerassist.html May 23, 2011, 3 pages.

* cited by examiner

*Primary Examiner* — Nathan J Newhouse
*Assistant Examiner* — Phillip Schmidt
(74) *Attorney, Agent, or Firm* — Reinhart Boerner Van Deuren s.c.

(57) ABSTRACT

An adjustable shoulder support harness with a 2-axis pivot assembly, capable of supporting power tools, such as a powered weed trimmer. The support harness distributes the weight of the tool and the woven and elastic straps allow the distance between the tool and the user to be varied, allowing for improved maneuverability of the tool by the user.

20 Claims, 9 Drawing Sheets

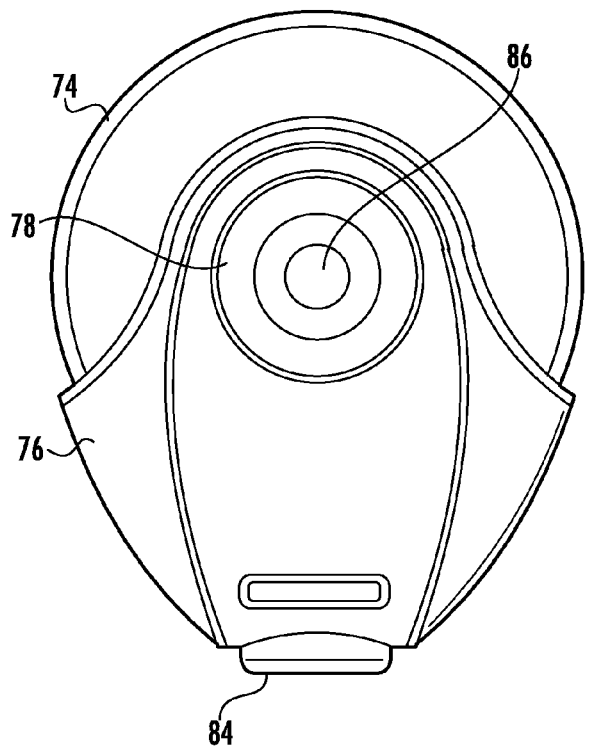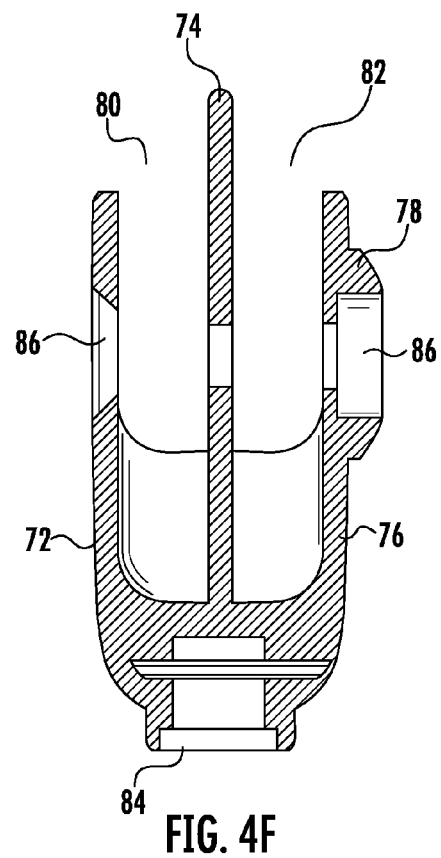
FIG. 4E
FIG. 4F

PIVOTING ELASTIC SHOULDER SUPPORT

BACKGROUND

The present invention relates to supporting handheld power tools. In particular, the present invention relates to an elastic shoulder support harness and pivot assembly for a power tool such as a motor powered weed trimmer.

SUMMARY

One embodiment relates to a support harness. The support harness includes an adjustment slide, a woven strap, a first bracket, a second bracket, a first elastic strap, a second elastic strap, a pivot frame, an elastic strap retainer, a hook and a shoulder pad. The woven strap is between 1 inch and 1.5 inches wide and between 0.05 inches and 0.25 inches thick and extends between a first end and second end. The first end attaches to the adjustment slide. The strap slidably engages the adjustment slide so that the first end is slidable relative to the strap to form a loop. The first bracket slidably engages with the loop. The second bracket attaches to the second end of the woven strap. The first elastic strap is between 1 inch and 1.5 inches wide, extends between a first end and a second end and includes a plurality of sleeves. Each sleeve is formed in a fabric cover that includes a plurality of elastic bands within the sleeves. The first end of the elastic strap is joined to the first bracket. The second elastic strap is between 1 inch and 1.5 inches wide, extends between a first end and a second end and includes a plurality of sleeves. Each sleeve is formed in a fabric cover that includes a plurality of elastic bands within the sleeves. The first end of the elastic strap is joined to the second bracket. Both the first elastic strap and second elastic strap have an elastic constant between 0.2 kg/cm and 0.4 kg/cm and in one embodiment preferably 0.3 kg/cm. The elastic strap retainer attaches to the second ends of the first elastic strap and second elastic strap to permit rotation of the elastic straps relative to the pivot frame about a first axis. The hook pivotally attaches to the pivot frame permitting rotation of the hook about a second axis that is generally perpendicular to the first axis. The shoulder pad attaches to the woven strap. The woven strap has an elastic constant of at least 10 times the elastic constant of the elastic straps.

Another embodiment relates to a support harness. The support harness includes an adjustment slide, a strap, a first bracket, a second bracket, a first elastic strap, a second elastic strap, a pivot frame, an elastic strap retainer, a hook and a shoulder pad. The strap is between 1 inch and 2 inches wide and between 0.05 inches and 0.25 inches thick extending between a first end and second end. The first end attaches to the adjustment slide. The strap slidably engages the adjustment slide so that the first end is slidable relative to the strap to form a loop. The first bracket slidably engages with the loop. The second bracket attaches to the second end of the strap. The first elastic strap is between 1.0 inch and 2.0 inches wide extending between a first end and second end that includes a plurality of sleeves. Each sleeve is formed in a fabric cover that includes a plurality of elastic bands within the sleeves. The first end of the elastic strap is joined to the first bracket. The second elastic strap is between 1 inch and 2 inches wide extending between a first end and a second end that includes a plurality of sleeves. Each sleeve is formed in a fabric cover that includes a plurality of elastic bands within the sleeves. The first end of the elastic strap is joined to the second bracket. The elastic strap retainer attaches to the second ends of the first elastic strap and second elastic strap and is pinned to the pivot frame permitting rotation of the retainer relative to the pivot frame about a first axis. The hook pivotally attaches to the pivot frame permitting rotation of the hook about a second axis that is generally perpendicular to the first axis. The shoulder pad attaches to the strap.

Yet another embodiment relates to a support harness. The support harness includes an adjustment slide, a woven strap, a first bracket, a second bracket, a first elastic strap, a second elastic strap, a pivot frame, an elastic strap retainer, a hook and a shoulder pad. The woven strap is 1.5 inches wide and between 0.05 inches and 0.25 inches thick extending between a first end and second end. The first end attaches to the adjustment slide. The strap slidably engages the adjustment slide so that the first end is slidable relative to the strap to form a loop. The first bracket slidably engages with the loop. The second bracket attaches to the second end of the strap. The first elastic strap is 1.5 inches wide extending between a first end and second end that includes a plurality of sleeves. Each sleeve is formed in a fabric cover that includes a plurality of elastic bands within the sleeves. The first end of the elastic strap is joined to the first bracket. The second elastic strap is 1.5 inches wide extending between a first end and second end that includes a plurality of sleeves. Each sleeve is formed in a fabric cover that includes a plurality of elastic bands within the sleeves. The first end of the elastic strap is joined to the second bracket. Both the first elastic strap and second elastic strap have an elastic constant in the range of 0.3 kg/cm and 0.9 kg/cm. The elastic strap retainer attaches to the second ends of the first elastic strap and second elastic strap and is pinnable to the pivot frame permitting rotation of the retainer relative to the pivot frame about a first axis. The hook pivotally attaches to the pivot frame permitting rotation of the hook about a second axis that is generally perpendicular to the first axis. The shoulder pad attaches to the strap. The woven strap has an elastic constant of at least 10 times the elastic constant of the elastic straps.

Yet another embodiment relates to a support harness. The support harness includes an adjustment slide, a woven strap, a first bracket, a second bracket, a first elastic strap, a second elastic strap, a pivot frame, an elastic strap retainer, a hook and shoulder pad. The woven strap is between 1 inch and 1.5 inches wide and between 0.05 inches and 0.25 inches thick extending between a first end and second end. The first end attaches to the adjustment slide. The strap slidably engages the adjustment slide so that the first end is slidable relative to the strap to form a loop. The first bracket slidably engages with the loop. The second bracket attaches to the second end of the strap. The first elastic strap is between 1 inch and 1.5 inches wide extending between a first end and second end that includes a plurality of sleeves. Each sleeve is formed in a fabric cover that includes a plurality of elastic bands within the sleeves. The first end of the elastic strap is joined to the first bracket. The second elastic strap is between 1 inch and 1.5 inches wide extending between a first end and second end that includes a plurality of sleeves. Each sleeve is formed in a fabric cover that includes a plurality of elastic bands within the sleeves. The first end of the elastic strap is joined to the second bracket. The elastic strap retainer attaches to the second ends of the first elastic strap and second elastic strap and is pinned to the pivot frame permitting rotation of the retainer relative to the pivot frame about a first axis. The hook pivotally attaches to the pivot frame permitting rotation of the hook about a second axis that is generally perpendicular to the first axis. The shoulder pad attaches to the strap. The woven strap is substantially non-elastic relative to the first elastic strap and second elastic strap.

Yet another embodiment relates to a support harness. The support harness includes an adjustment slide, a strap, a first bracket, a second bracket, a first elastic strap, a second elastic strap, a pivot frame, an elastic strap retainer, a hook and a shoulder pad. The strap is between 1 inch and 2 inches wide and between 0.05 inches and 0.25 inches thick extending between a first end and second end. The first end attaches to the adjustment slide. The strap slidably engages the adjustment slide so that the first end is slidable relative to the strap to form a loop. The first bracket slidably engages with the loop. The second bracket attaches to the second end of the strap. The first elastic strap is between 1 inch and 2 inches wide extending between a first end and second end that includes a plurality of sleeves. Each sleeve is formed in a fabric cover that includes a plurality of elastic bands within the sleeves. The first end of the elastic strap is joined to the first bracket. The second elastic strap is between 1 inch and 2 inches wide extending between a first end and second end that includes a plurality of sleeves. Each sleeve is formed in a fabric cover that includes a plurality of elastic bands within the sleeves. The first end of the elastic strap is joined to the second bracket. The elastic strap retainer attaches to the second ends of the first elastic strap and second elastic strap and is pinnable to the pivot frame permitting rotation of the retainer relative to the pivot frame about a first axis. The hook pivotally attaches to the pivot frame permitting rotation of the hook about a second axis that is generally perpendicular to the first axis. The shoulder pad attaches to the strap.

Yet another embodiment relates to a support harness. The support harness includes an adjustment strap, a first bracket, a second bracket, a pair of elastic straps, a pivot frame, an elastic strap retainer and a hook. The strap has a generally rectangular cross-section with a width to thickness ratio in the range of 4 to 10. The strap is adjustable and attached to the elastic straps. The elastic straps are pivotally attached to the pivot frame which includes a hook that pivots along an axis which is not parallel with the axis upon which the elastic straps pivot. The elastic strap may also have a generally rectangular cross-section with a width to thickness ratio in the range of 4 to 10.

BRIEF DESCRIPTION OF THE FIGURES

FIGS. 4A to 4E are side, top, bottom and front end views of the pivot assembly;
FIG. 4F is a sectional view taken along section line 4F-4F in FIG. 4A.

DETAILED DESCRIPTION OF THE EXEMPLARY EMBODIMENTS

Figure 1:
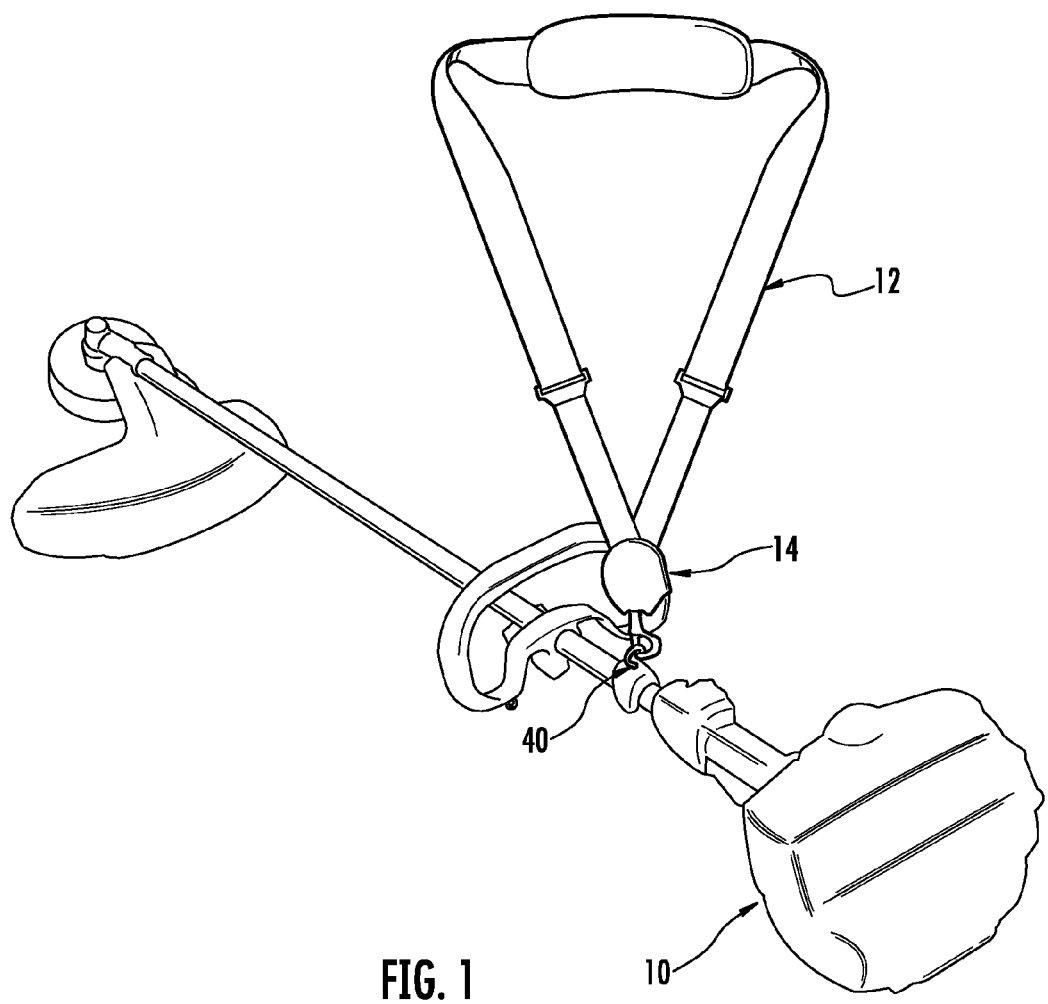
FIG. 1 is a schematic illustration of a powered weed trimmer supported relative to a shoulder support harness and pivot assembly.

Referring to FIG. 1, a power tool such as a gas-powered weed trimmer 10 is supported by a shoulder support harness 12 and a 2-axis pivot assembly 14. The support harness 12 includes an adjustment slide 16, a woven strap 18, brackets 20 and 22, elastic straps 24 and 26, elastic strap retainers 28 and 30, a pivot frame 32, a hook 34 and a shoulder pad 36. Hook 34 is connectable to a corresponding hook or eye assembly 40 which is added to tool 10 after purchase or included with the tool as an OEM feature. In general, harness 12 provides support for tool 10 by transferring a substantial portion of the weight of tool 10 to the shoulder of a person using the tool. Pad 36 is not required, but depending upon the configuration of strap 18, pad 36 may be used to provide added comfort for the user.

In contrast to a rigid shoulder harness, the combination provided by harness 12 which includes elastic straps 24 and 26 and the 2-axis assembly 14, provides improved manuverability of tool 10 when supported from the shoulder of a user. In particular, the elastic allows the user to vary the distance between the users shoulder and tool 10 which permits the user to manipulate tool 10 with more precision during cutting. To further improve the ease of tool 10 movement, elastic straps 24 and 26 are provided with structure to permit pivoting relative to frame 32 about a first axis, and hook 34 also pivots relative to frame 32 at a second axis which is not parallel with the first axis. Preferably, the first and second axes are substantially perpendicular to each other (e.g., 90°).

Figure 2A:
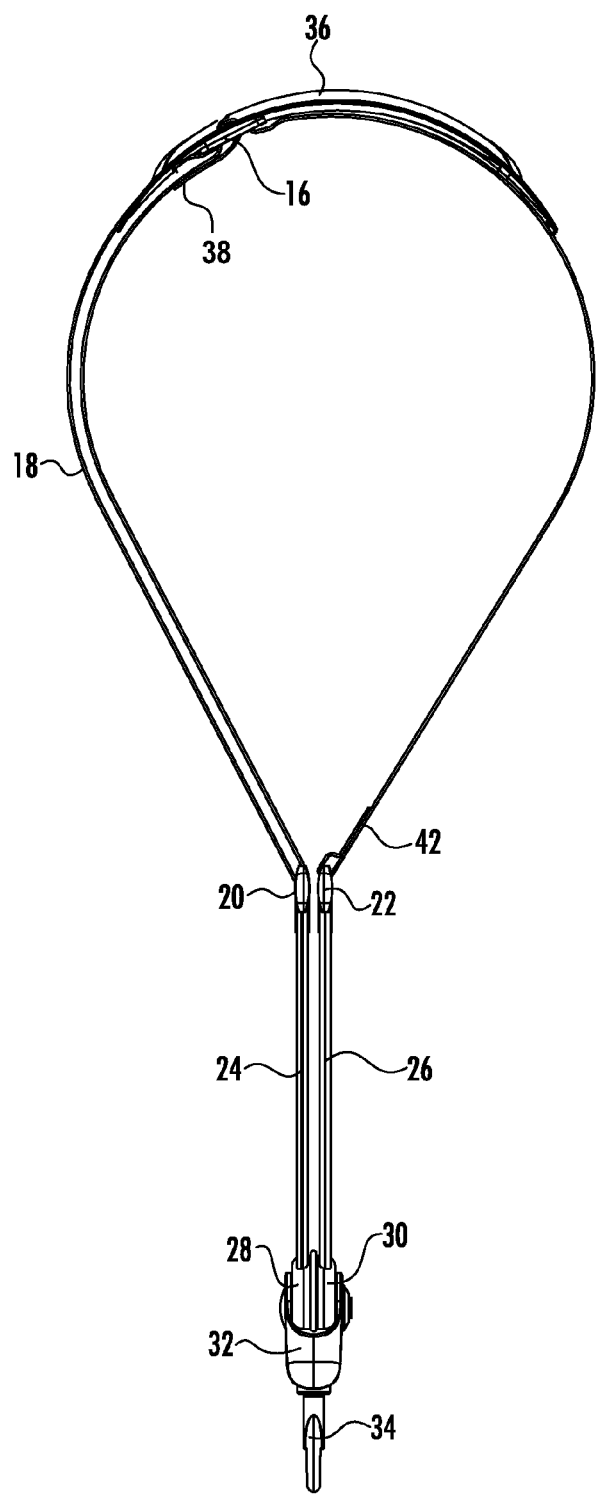
FIGS. 2A and 2B are front and side views of the shoulder support.
Figure 2B:
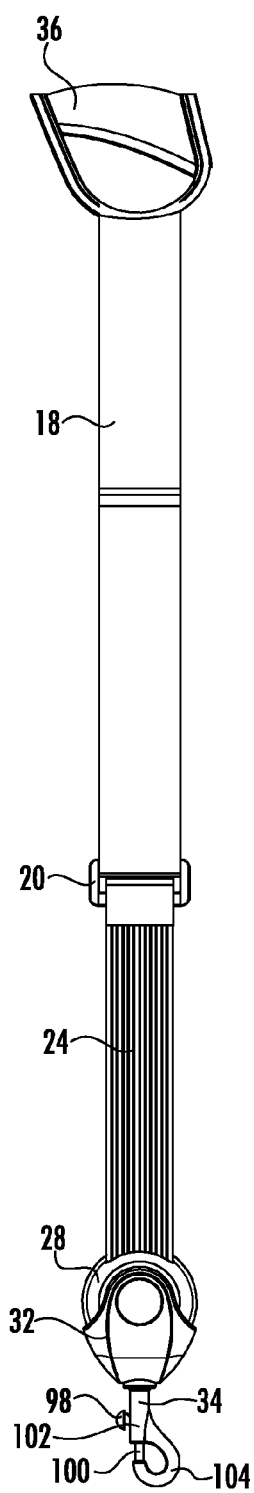

Referring to FIGS. 2A and 2B, the woven strap 18 has a first end 38 and second end 42 and is between 1 inch and 1.5 inches wide and between 0.05 inches and 0.25 inches thick and extends the length between woven strap first end 38 and woven strap second end 42. Woven strap 18 has an elastic constant that is at least 10 times the elastic constant of the elastic straps 24, 26. Alternative embodiments may have a woven strap with varying elastic constants, widths and thicknesses. For example, woven strap 18 may be relatively non-elastic relative to the elastic straps and/or 1 inch to 2 inches wide and 0.05 inches to 0.25 inches thick. Preferably, strap 18 is between 1 inch and 1.5 inches wide. The woven strap is fabricated using polypropylene in the exemplary embodiment. Alternative embodiments may have the woven strap constructed from other forms of plastic, textile or cloth material.

Figure 3:
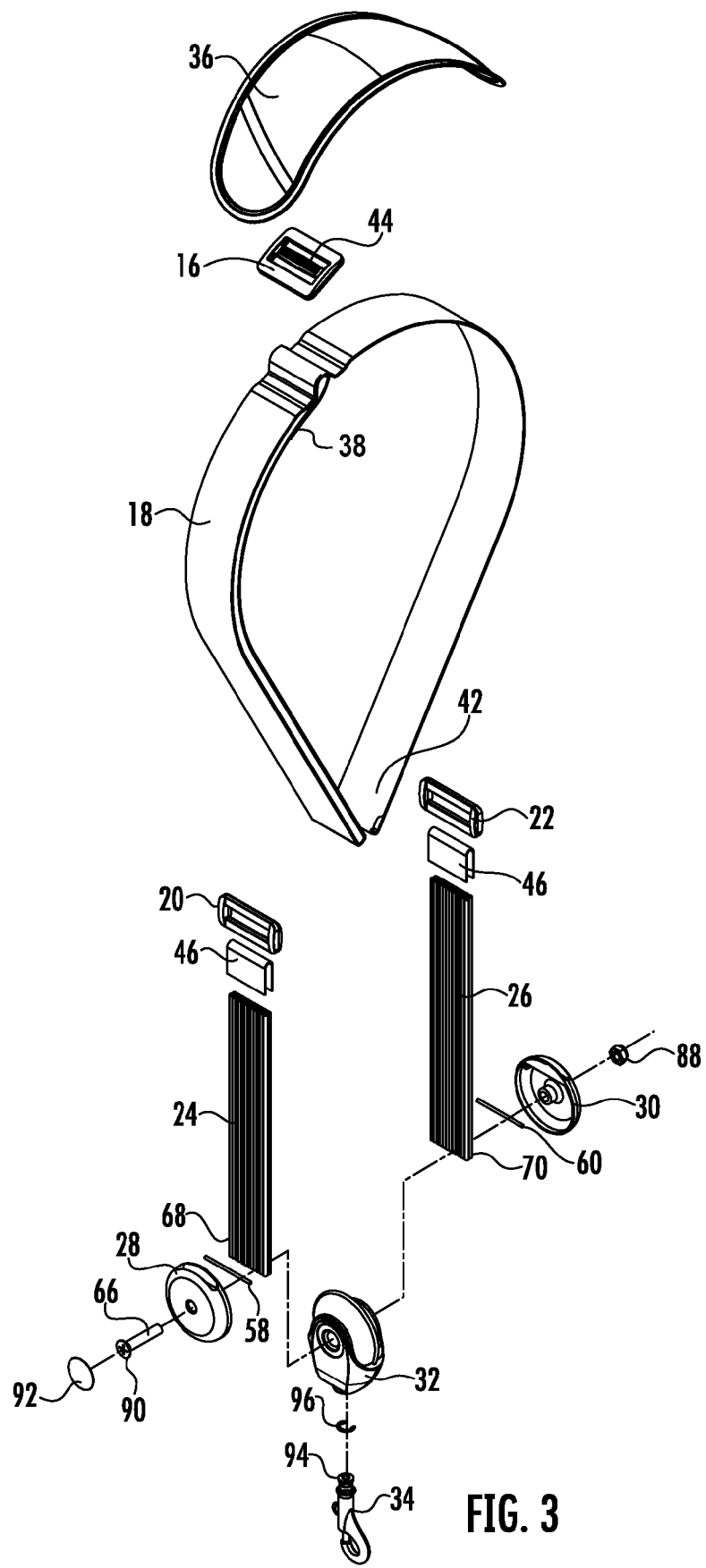
FIG. 3 is an exploded view of the shoulder support.
Figure 4A:
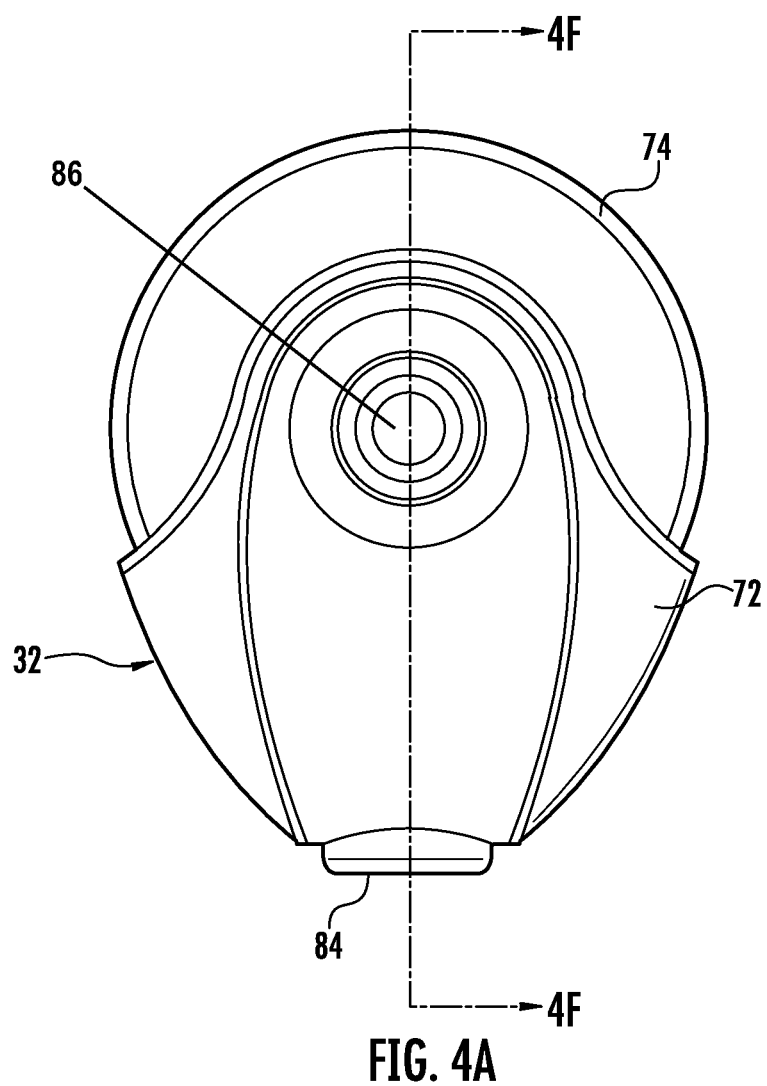
Figure 4B:
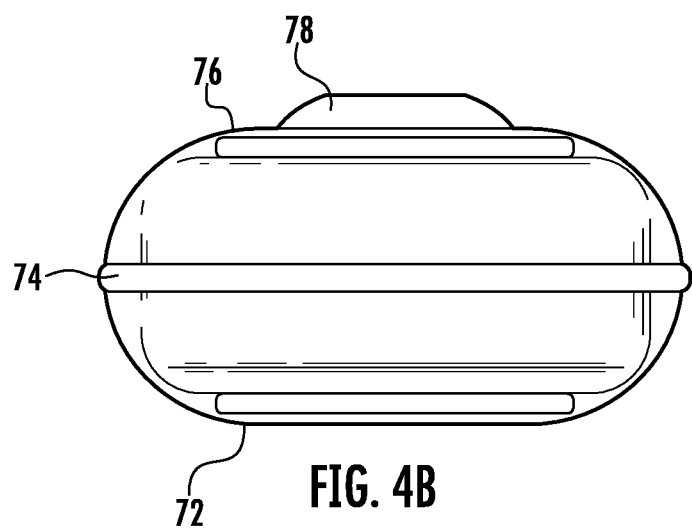
Figure 4C:
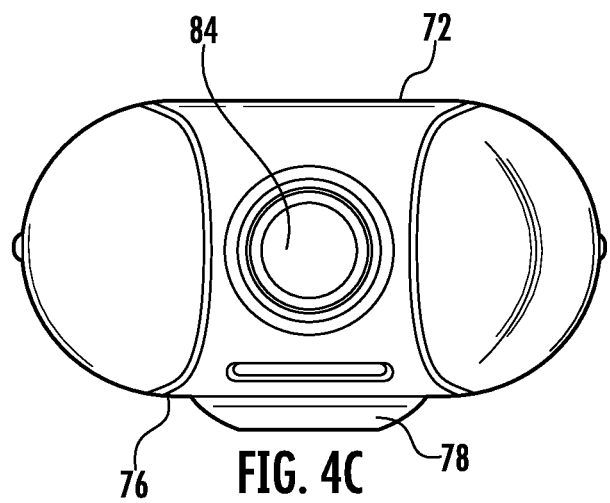
Figure 4D:
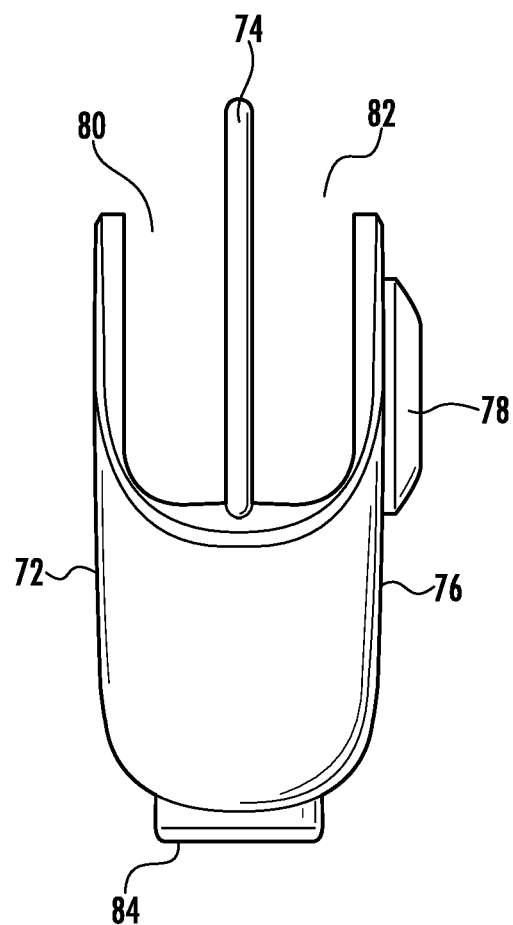
Figure 5A:
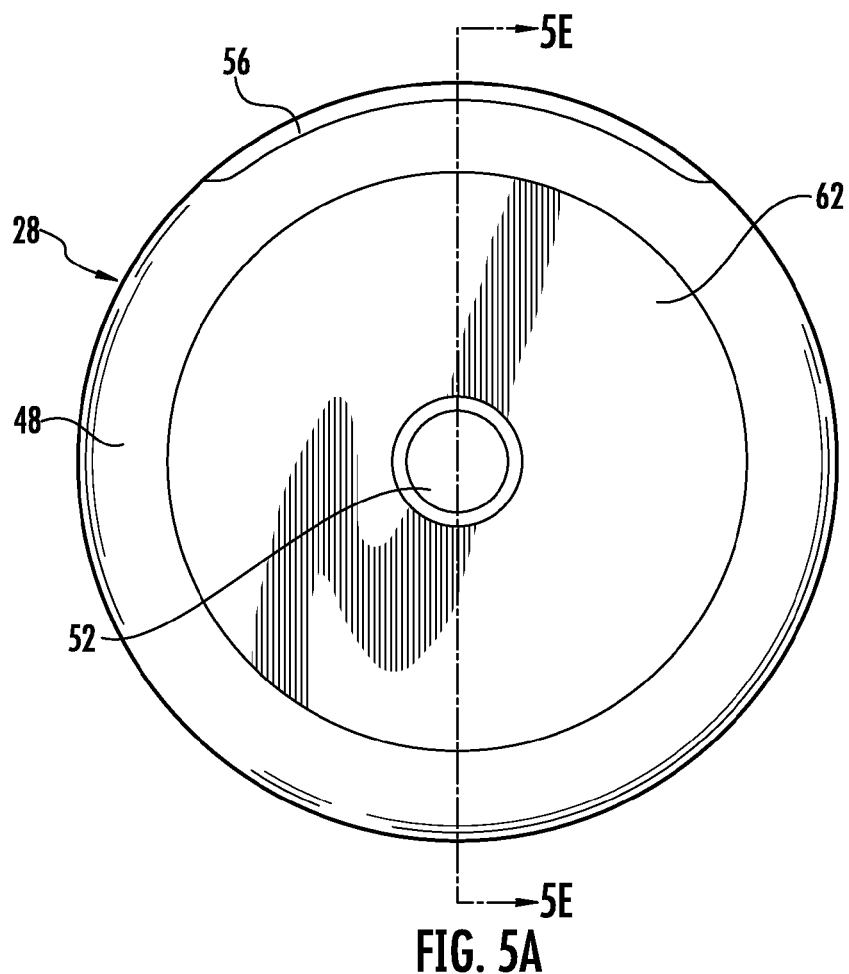
FIGS. 5A to 5D are outside, top, inside and side end views of the elastic strap retainers.
Figure 5B:
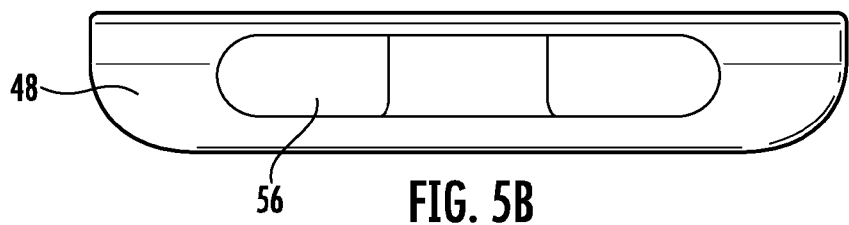
Figure 5C:
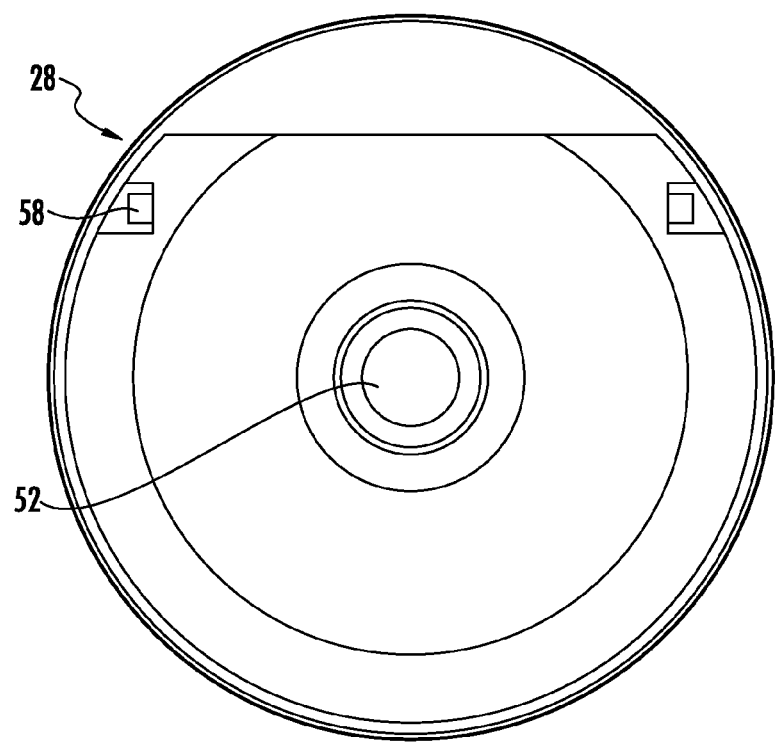
Figure 5D:
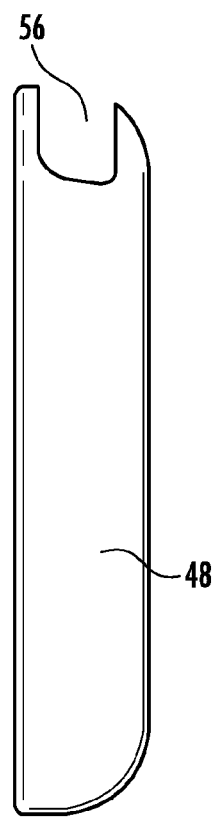
Figure 5E:
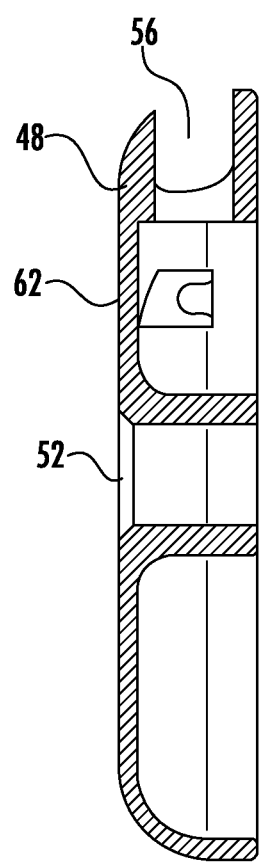
FIG. 5E is a sectional view taken along section line 5E-5E in FIG. 5A.

Referring to FIG. 3, woven strap 18 first end 38 is attached to the adjustment slide 16. Adjustment slide 16 is generally rectangular in shape and includes a rod 44 that bisects the adjustment slide 16. The woven strap first end 38 wraps around the rod 44 and is secured to the woven strap 18 by suitable stitching, adhesive or some other method enabling the first end to remain in a stationary area along the woven strap. The exemplary embodiment includes an adjustment slide 16 fabricated, all or in part, of a type of plastic (e.g., acetal, polyacetal, polyformaldehyde, polypropylene, etc.). Alternative embodiments may have an adjustment slide of a different shape (e.g., a circle) and composed of an appropriate metal (e.g., steel). The adjustment slide 16 can be located anywhere in between the first and second ends of the woven strap 38, 42. The woven strap first end 38 and the adjustment slide 16 are engaged in order for the woven strap 18 to slide along the strap 18 to from a loop. The loop formed can be of varying sizes based upon the location of the adjustment slide 16 on the woven strap 18. For example, the closer the adjustment slide 16 is to the woven strap first end 38, the larger the loop size, increasing the length between the first and second ends 38, 42; the closer the adjustment slide 16 is to the woven strap second end 42, the smaller the loop size, decreasing the length between the first and second ends 38, 42.

Referring to FIGS. 2A and 2B again, the shoulder pad 36 may be slidably engaged with the woven strap 18. The shoulder pad 16 has two ends, adjoining with the woven strap 18 in a parallel manner. Each end of the shoulder pad 36 has an opening allowing for the woven strap 18 to pass though. The exterior side of the woven strap 18 abuts to the top portion of the shoulder pad 36 that is fabricated, in whole or in part, of a polyester nylon fabric. Portions of shoulder pad 36 may be fabricated using a textured polyester fabric or webbing created from polyester and nylon. The interior side of the woven strap 18 abuts to the padding of the shoulder pad 36. This padding is made out of a type of foam (e.g., urethane) creating a cushion for the weight the woven strap 18 is bearing. In alternative embodiments the shoulder pad may be attached directly onto the woven strap, thus resulting in a stationary position between the first and second ends of the woven strap and may be fabricated from other forms of plastic, textile or cloth material.

Still referring to FIGS. 2A and 2B, the loop formed by the relationship between the woven strap first end 38 and the adjustment slide 16 is slidably engaged with a first bracket 20. The first bracket 20 is constructed of a plastic material with an opening that is slightly greater than the width and thickness of the woven strap 18 to allow the loop of the woven strap 18 to pass through freely. In alternative embodiments that do not have a loop, the first bracket may be attached to the first end of the woven strap.

The woven strap second end 42 is attached to a second bracket 22. The second bracket 22 has an opening that is slightly greater than the width and thickness of the woven strap 18 to allow the woven strap second end 42 to pass through and be secured to the woven strap 18 by suitable stitching, adhesive or some other method enabling the second end 42 to remain in a stationary position along the woven strap 18. The second bracket 22 and first bracket 20 are structurally similar to each other. Alternative embodiments may have the first and second brackets created from a type of metal (e.g., steel) that also may be attached.

Referring to FIG. 3, both the first and second brackets 20, 22 have a sleeve 46 that wraps around the portion of the bracket that is not attached to the woven strap ends 38, 42. The sleeves 46 securely fasten the first ends of the first and second elastic straps 24, 26 to the first and second brackets 20, 22, respectively. The sleeves 46 have an opening at a width and thickness to receive the first ends of the elastic straps 24, 26. The elastic strap first ends 24, 26 are securely attached to the protective sleeves 46 with suitable crimping, pinning, stitching, adhesive or other structures which hold the ends in engagement with sleeves 46.

Referring once again to FIG. 3, the widths of elastic straps 24, 26 are between 1 inch and 2 inches and between 0.05 inches and 0.25 inches thick. Preferably, straps 24, 26 are 1 inch to 1.5 inches wide. Straps 24, 26 extend between first and second ends as shown. Each elastic strap 24, 26 includes a plurality of sleeves formed from a fabric extending between the ends. A plurality of elastic bands are located within each of the sleeves depending upon the desired elastic constant of the straps 24, 26. The number of elastic bands located within each sleeve may vary and may be arranged in different configurations. For example elastic straps 24, 26 may include at least two elastic bands in each elastic sleeve that extend the length between the ends of the straps. A different number of elastic bands located within each sleeve may be found in alternative embodiments (e.g., at least three elastic bands). The exemplary embodiment has an elastic constant of substantially 0.3 kg/cm. Alternative embodiments may have an elastic constant in the range of 0.3 kg/cm to 0.9 kg/cm.

Referring to FIGS. 5A-5E, the elastic strap retainers 28, 30 include disks 48, 50 and pivot holes 52, 54. The respective elastic strap second ends 68, 70 are inserted through the opening 56 in the top surface of disks 48, 50. This opening 56 is slightly greater than the width and thickness of the corresponding elastic straps 24, 26. The elastic straps 24, 26 are secured to the respective disks 48, 50 by pins 58, 60. The disks 48, 50 are generally circular in shape. The diameter of the disks 48, 50 is larger than the width of the elastic straps 24, 26. The disks 48, 50 circular edge tapers in an outwardly direction to an outer surface 62, 64 of the disks 48, 50 that is smaller in diameter. Both disks 48, 50 have a pivot hole 52, 54 located at the center of the outer surface 62, 64 extending through the thickness of the disks 48, 50. A pivot pin 66 passes through the pivot holes 52, 54 to attach the disks 48, 50 to the pivot frame 32. The elastic strap retainers 28, 30 that secure the elastic straps second ends 68, 70 pivotally attach to the pivot frame 32 to permit rotation of the second ends 68, 70 relative to the pivot frame 32 about a first axis. The pivot hole may have the capability of receiving a threaded or smooth surface pivot pin in various embodiments.

Referring to FIGS. 4A-4F, the pivot frame 32 includes a first exterior side 72, a divider 74, a second exterior side 76, a washer 78, a first slot 80, a second slot 82 and a bottom opening 84. The first slot 80 and second slot 82 permit the elastic strap retainers 28, 30 to attach to the pivot frame 32. The first elastic strap retainer 28 inserts into the first slot 80. The second elastic strap retainer 30 inserts into the second slot 82. Both slots 80, 82 in the pivot frame 32 are slightly greater in width and thickness than the elastic strap retainers 28, 30. The first and second slots 80, 82 are separated by a divider 74. The divider 74 is attached to the pivot frame 32 and has a hole 86 to allow the pivot pin 66 to pass through. The first exterior side 72, first elastic retainer 28, divider 74, second elastic retainer 30, second exterior side 76 and washer 78 all have a pivot hole 86 to allow pivot pin 66 to pass through the entire pivot frame 32.

The pivot pin 66 shown in FIG. 3 inserts into the pivot frame 32 from the first exterior side 72 through to the washer 78, leaving the end of the pivot pin 66 exposed. The exposed pivot pin end is covered with a nut cap 88. The pivot pin head 90 located on the first exterior side 72 is concealed with a cover 92.

Again, referring to FIGS. 3 and 4A-4F, the bottom opening 84 of the pivot frame 32 is circular in shape and allows for pivot hook 34 to attach to the pivot frame 32. The pivot hook 34 is secured to the pivot frame 32 by inserting the threaded end 94 into the bottom opening 84 of the pivot frame 32 by using a twisting motion. The pivot hook 34 attaches to the pivot frame 32 to permit rotation of the hook 34 about a second axis that is generally perpendicular to the first axis. Alternative embodiments may have a pivot hook with a smooth end that can be attached to the pivot frame by applying manual pressure. The pivot hook 34 also has a connector 96 around the threaded end 94 of the pivot hook 34. This connector 96 is capable of distributing the weight the support harness is bearing, in addition to providing a surface to permit a more secure connection between the pivot hook 34 and the pivot frame 32.

Referring to FIG. 2B, the pivot hook 34 has a lever 98, latch 100, shaft 102 and hook 104. When pressure is applied to the lever 98, the latch 100 retracts into the shaft 102 of the pivot hook 34, allowing for the hook 104 to be attached to various objects (e.g. hook 40). When the pressure is removed from the lever 98, the latch 100 asserts joining with hook 104 forming a closure. The hook 104 may carry between 20 and 80 pounds.

For purposes of this application, it is understood that the numbers are meant to define a range which covers the full range of the last significant figure centered on the last significant figure. For example, 1.5 would cover the range between 1.0 and 2.0, 1.1 would cover 0.60 to 1.6, etc.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A support harness comprising:
   an adjustment slide;
   a woven strap between 1 and 1.5 inches wide and between 0.05 inches and 0.25 inches thick extending between a first end and a second end, the first end being attached to the adjustment slide and the strap being slidably engaged with the adjustment slide such that the first end is slidable relative to the strap to form a loop;
   a first bracket slidably engaged with the loop;
   a second bracket attached to the second end;
   a first elastic strap between 1 and 1.5 inches wide and extending between a first end and a second end, the first elastic strap including a plurality of sleeves formed in a fabric cover and a plurality of elastic bands located within each of the sleeves and extending between the first and second ends of the first elastic strap, the first end of the first elastic strap being joined to the first bracket;
   a second elastic strap between 1 and 1.5 inches wide and extending between a first end and a second end, the second elastic strap including a plurality of sleeves formed in a fabric cover and a plurality of elastic bands located within each of the sleeves and extending between the first and second ends of the second elastic strap, the first end of the second elastic strap being joined to the second bracket, the first and second elastic straps having an elastic constant of substantially 0.3 kg/cm;
   a pivot frame pivotally attached to the second ends of the elastic straps to permit rotation of the second ends relative to the pivot frame about a first axis;
   a hook pivotally attached to the pivot frame to permit rotation of the hook about a second axis generally perpendicular to the first axis; and
   a shoulder pad attached to the strap, wherein the woven strap has an elastic constant at least 10 times the elastic constant of the elastic straps.

2. The harness of claim 1, wherein at least 3 elastic bands are located in each sleeve.

3. The harness of claim 2, further comprising an elastic strap retainer including;
   a first disk pinned to the second end of the first elastic strap and including a first pivot hole;
   a second disk pinned to the second end of the second elastic strap and including a second pivot hole; and
   a pivot pin passing through the first and second pivot holes to pivotally attach the disks to the pivot frame.

4. The harness of claim 3, wherein the first bracket may be attached to the second bracket and the shoulder pad is slideable relative to the woven strap.

5. A support harness comprising:
   an adjustment slide;
   a strap between 1 and 2 inches wide and between 0.05 inches and 0.25 inches thick extending between a first end and a second end, the first end being attached to the adjustment slide and the strap being slidably engaged with the adjustment slide such that the first end is slidable relative to the strap to form a loop;
   a first bracket slidably engaged with the loop;
   a second bracket attached to the second end;
   a first elastic strap between 1 and 2 inches wide and extending between a first end and a second end, the first elastic strap including a plurality of sleeves formed in a fabric cover and a plurality of elastic bands located within each of the sleeves and extending between the first and second ends of the first elastic strap, the first end of the first elastic strap being joined to the first bracket;
   a second elastic strap between 1 and 2 inches wide and extending between a first end and a second end, the second elastic strap including a plurality of sleeves formed in a fabric cover and a plurality of elastic bands located within each of the sleeves and extending between the first and second ends of the second elastic strap, the first end of the second elastic strap being joined to the second bracket;
   a pivot frame;
   an elastic strap retainer attached to the second ends of the first and second elastic straps and pinned to the pivot frame to permit rotation of the retainer relative to the pivot frame about a first axis;
   a hook pivotally attached to the pivot frame to permit rotation of the hook about a second axis generally perpendicular to the first axis; and
   a shoulder pad supported by the strap.

6. The harness of claim 5, wherein the elastic strap retainer comprises;
   a first disk pinned to the second end of the first elastic strap and including a first pivot hole;
   a second disk pinned to the second end of the second elastic strap and including a second pivot hole; and
   a pivot pin passing through the first and second pivot holes to pivotally attach the disks to the pivot frame.

7. The harness of claim 6, wherein the first bracket may be attached to the second bracket.

8. The harness of claim 7, wherein at least 3 elastic bands are located in each sleeve.

9. A support harness comprising:
   an adjustment slide;
   a woven strap between 1 and 1.5 inches wide and between 0.05 inches and 0.25 inches thick extending between a first end and a second end, the first end being attachable to the adjustment slide and the strap being slidably engageable with the adjustment slide such that the first end is slidable relative to the strap to form a loop;
   a first bracket slidably engageable with the loop;
   a second bracket attachable to the second end;
   a first elastic strap approximately the same width as the woven strap and extending between a first end and a second end, the first elastic strap including a plurality of sleeves formed in a fabric cover and a plurality of elastic bands located within each of the sleeves and extending between the first and second ends of the first elastic strap, the first end of the first elastic strap being joinable to the first bracket;

a second elastic strap approximately the same width as the woven strap and extending between a first end and a second end, the second elastic strap including a plurality of sleeves formed in a fabric cover and a plurality of elastic bands located within each of the sleeves and extending between the first and second ends of the second elastic strap, the first end of the second elastic strap being joinable to the second bracket, the first and second elastic straps each having an elastic constant in the range of 0.3 to 0.9 kg/cm;

a pivot frame;

an elastic strap retainer attachable to the second ends of the first and second elastic straps and pinnable to the pivot frame to permit rotation of the retainer relative to the pivot frame about a first axis;

a hook pivotally attachable to the pivot frame to permit rotation of the hook about a second axis generally perpendicular to the first axis; and a shoulder pad supported by the woven strap, wherein the woven strap has an elastic constant at least 10 times the elastic constant of the elastic straps.

10. The harness of claim 9, wherein the elastic strap retainer comprises;

a first disk pinned to the second end of the first elastic strap and including a first pivot hole;

a second disk pinned to the second end of the second elastic strap and including a second pivot hole; and a pivot pin passing through the first and second pivot holes to pivotally attach the disks to the pivot frame.

11. The harness of claim 10, wherein the first bracket may be attached to the second bracket.

12. The harness of claim 11, wherein at least 3 elastic bands are located in each sleeve.

13. A support harness comprising:

an adjustment slide;

a woven strap between 1 and 1.5 inches wide and between 0.05 inches and 0.25 inches thick extending between a first end and a second end, the first end being attached to the adjustment slide and the strap being slidably engaged with the adjustment slide such that the first end is slidable relative to the strap to form a loop;

a first bracket slidably engaged with the loop;

a second bracket attached to the second end;

a first elastic strap between 1 and 1.5 inches wide and extending between a first end and a second end, the first elastic strap including a plurality of sleeves formed in a fabric cover and a plurality of elastic bands located within each of the sleeves and extending between the first and second ends of the first elastic strap, the first end of the first elastic strap being joined to the first bracket;

a second elastic strap between 1 and 1.5 inches wide and extending between a first end and a second end, the second elastic strap including a plurality of sleeves formed in a fabric cover and a plurality of elastic bands located within each of the sleeves and extending between the first and second ends of the second elastic strap, the first end of the second elastic strap being joined to the second bracket;

a pivot frame;

an elastic strap retainer attached to the second ends of the first and second elastic straps and pinned to the pivot frame to permit rotation of the retainer relative to the pivot frame about a first axis;

a hook pivotally attached to the pivot frame to permit rotation of the hook about a second axis generally perpendicular to the first axis; and a shoulder pad supported by the woven strap, wherein the woven strap is substantially non-elastic.

14. The harness of claim 13, wherein the elastic strap retainer comprises;

a first disk pinned to the second end of the first elastic strap and including a first pivot hole;

a second disk pinned to the second end of the second elastic strap and including a second pivot hole; and a pivot pin passing through the first and second pivot holes to pivotally attach the disks to the pivot frame.

15. The harness of claim 14, wherein the first bracket may be attached to the second bracket.

16. The harness of claim 15, wherein at least 3 elastic bands are located in each sleeve.

17. A support harness comprising:

an adjustment strap between 1 and 2 inches wide and between 0.05 inches and 0.25 inches thick extending between a first end and a second end;

a first bracket attached to the first end;

a second bracket attachable to the second end;

a first elastic strap between 1 and 2 inches wide and extending between a first end and a second end, the first elastic strap including a plurality of sleeves formed in a fabric cover and a plurality of elastic bands located within each of the sleeves and extending between the first and second ends of the first elastic strap, the first end of the first elastic strap being joinable to the first bracket;

a second elastic strap between 1 and 2 inches wide and extending between a first end and a second end, the second elastic strap including a plurality of sleeves formed in a fabric cover and a plurality of elastic bands located within each of the sleeves and extending between the first and second ends of the second elastic strap, the first end of the second elastic strap being joinable to the second bracket;

a pivot frame;

an elastic strap retainer attachable to the second ends of the first and second elastic straps and pinnable to the pivot frame to permit rotation of the retainer relative to the pivot frame about a first axis;

a hook pivotally attachable to the pivot frame to permit rotation of the hook about a second axis generally perpendicular to the first axis; and a shoulder pad supported by the strap.

18. The harness of claim 17, wherein the elastic strap retainer comprises;

a first disk pinned to the second end of the first elastic strap and including a first pivot hole;

a second disk pinned to the second end of the second elastic strap and including a second pivot hole; and a pivot pin passing through the first and second pivot holes to pivotally attach the disks to the pivot frame.

19. The harness of claim 18, wherein the first bracket may be attached to the second bracket.

20. The harness of claim 19, wherein at least 3 elastic bands are located in each sleeve.

* * * * *